United States Patent [19]

Ray

[11] Patent Number: 4,687,092
[45] Date of Patent: Aug. 18, 1987

[54] PROPORTIONALLY DISPLACED COUPLED WALKING BEAMS

[75] Inventor: Francis M. Ray, Glenview, Ill.

[73] Assignee: Zenith Electronics Corporation, Glenview, Ill.

[21] Appl. No.: 808,789

[22] Filed: Dec. 13, 1985

[51] Int. Cl.$^4$ ............................................. B65G 47/31
[52] U.S. Cl. ..................................... 198/461; 198/774
[58] Field of Search .............. 198/461, 774, 576, 579, 198/609, 614

[56] References Cited

U.S. PATENT DOCUMENTS 3,823,461  7/1974  Squires et al. ................ 198/774 X
4,523,672  6/1985  Navarro ............................ 198/461

FOREIGN PATENT DOCUMENTS 1941103  2/1970  Fed. Rep. of Germany ...... 198/774

Primary Examiner—Joseph E. Valenza
Assistant Examiner—Jonathan D. Holmes
Attorney, Agent, or Firm—Cornelius J. O'Connor; Thomas E. Hill

[57] ABSTRACT

First and second walking beams are coupled by a proportional displacement arrangement to a reciprocating drive mechanism. Respective ends of the first and second walking beams are positioned in close proximity to one another to permit an article positioned on the first walking beam to be transferred to the second walking beam. The first walking beam has a close or narrow pitch between adjacent article-bearing slots thereon, while the second walking beam has a wide pitch. Interarticle spacing on the second walking beam is thus greater than the spacing between adjacent articles on the first walking beam. This arrangement permits a large number of closely spaced articles to be simultaneously deposited upon the first walking beam while standard spacing may be provided between the articles on the second walking beam for improved efficiency in the automatic positioning and handling of the articles. This coupled walking beam arrangement is particularly adapted for the sequential positioning of electronic-/electrical components for manipulation by automatic handling apparatus.

13 Claims, 7 Drawing Figures

PROPORTIONALLY DISPLACED COUPLED WALKING BEAMS

BACKGROUND OF THE INVENTION

This invention relates generally to conveyor-type article transport mechanisms and is particularly directed to an arrangement for changing the spacing between adjacent articles as they are linearly displaced on a conveyor-type transport mechanism without interrupting the transport of the articles.

Automatic procedures and apparatus are increasingly being used in manufacturing for sequentially displacing a plurality of articles of manufacture to various work stations. At each work station the articles undergo another step in the manufacturing process which typically involves the manipulation and processing of the article by automatic handling apparatus. In one common approach, each article is positioned upon and displaced by a conveyor-like transport mechansim to various work stations whereat each article is, in turn, manipulated such as by a robotic grasping arm with pincers for positioning or orienting the article as desired. This procedure is particulary adapted for the high speed, automatic handling of large numbers of electronic/electrical components which undergo various fabrication, testing and circuit insertion procedures at several work stations.

Where the articles being processed, such as in the case of electronic/electrical components, are small in size, special consideration must be given to the design and operation of th transport system used to convey the articles between the various work stations. For example, sufficient inter-article space must be provided to allow the article manipulating apparatus to grasp one article without disturbing the position and orientation of adjacent articles. In addition, sufficient inter-article space frequently must be provided to allow an article to undergo a manufacturing process step, e.g., testing, re-orientation, etc., while positioned adjacent to the conveyor-like transport mechanism without interrupting the displacement of the transport mechanism or disturbing immediately adjacent articles. However, the inter-article spacing required for processing and manipulating the articles is generally greater than the optimum spacing for deposit of the articles on the conveyor-like transport mechanism. For example, in order to minimize space and the time required for deposit of the articles upon the conveyor-like transport mechanism, a large number of articles should simultaneously be positioned upon the transport mechanism in a closely spaced arrangement. However, as described above, this close inter-article spacing may not allow for the aforementioned automatic manipulation of the articles such as by a robotic grasping arm with pincers.

The present invention addresses the aforementioned article spacing problem in a conveyor-like transport system by providing for the proportional displacement of first and second adjacent walking beams between which articles are transferred to allow the articles to be linearly displaced with a first inter-article spacing on one of the walking beams and with a second, different inter-article spacing on the other walking beam.

OBJECTS OF THE INVENTION

Accordingly, it is an object of the present invention to provide improved handling of articles which are displaced between two points such as in the manufacture, testing or assembly of the articles.

It is another object of the present inventon to change the spacing between adjacent articles positioned upon and displaced by a conveyor-like transport system without interrupting the displacement of the articles.

Yet another object of the present invention is to provide an improved electronic component displacement arrangement for use in a component transport walking beam.

A further object of the present invention is to provide for the transfer of articles between first and second walking beams having different pitch values.

A still further object of the present invention is to displace first and second walking beams having different operating characteristics by means of a single drive mechanism.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
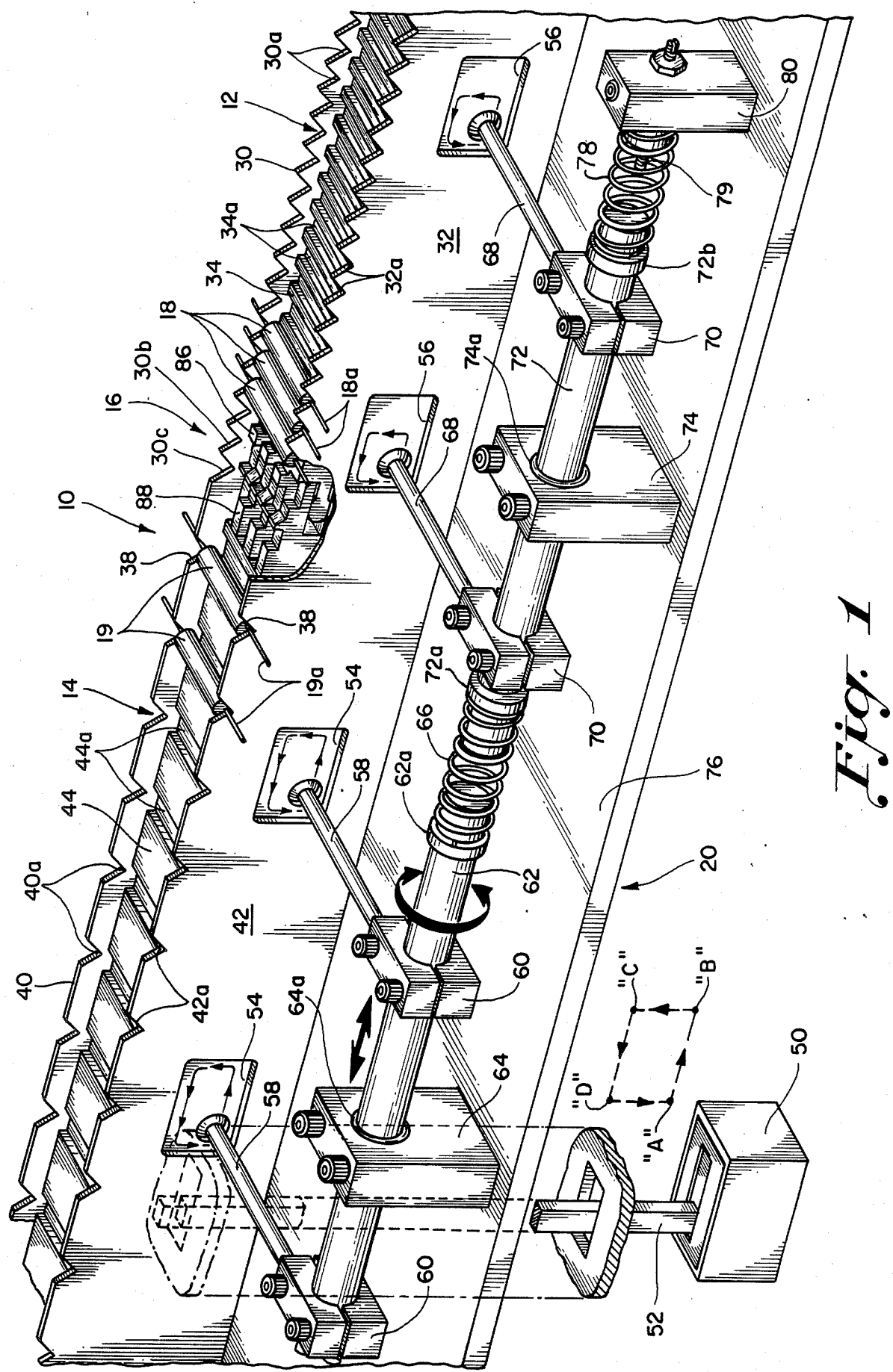
FIG. 1 is a perspective view of a system for proportionally displacing coupled walking beams in accordance with the present invention.
Figure 2:
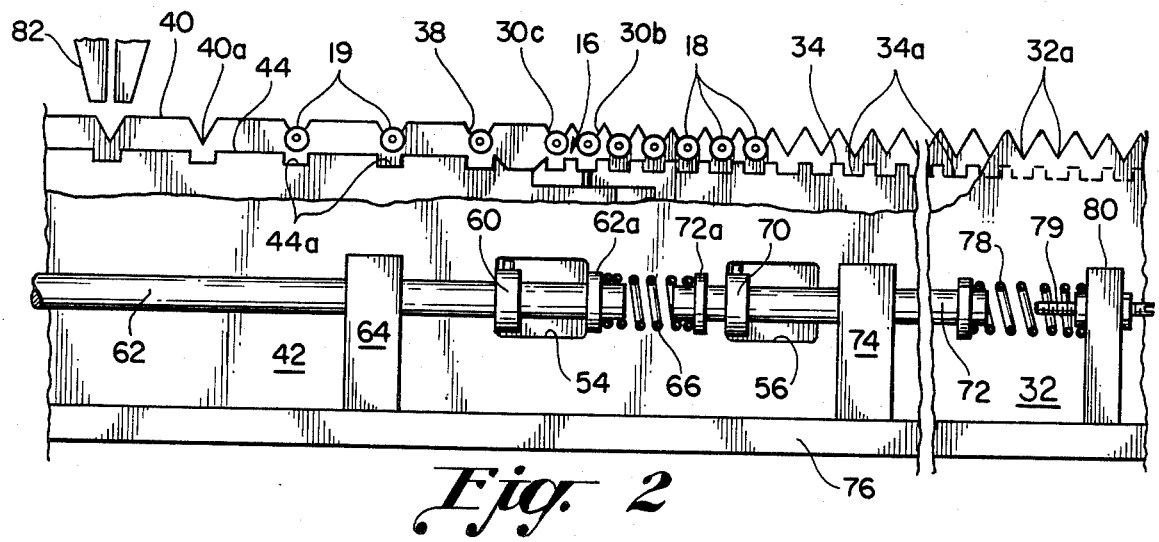
FIGS. 2 through 5 are partially cutaway lateral sectional views of the proportionally displaced coupled walking beams of FIG. 1 illustrating the sequential displacement of the walking beams as well as the motion of the walking beam drive system.

Referring to FIG. 1, there is shown a proportionally displaced coupled walking beam system 10 in accordance with the present invention. The proportionally displaced coupled walking beam system 10 includes first and second walking beam assemblies 12, 14. The first walking beam assembly 12 includes a right-hand rail 30 and a left-hand rail 32. As used herein, the terms "right-hand" and "left-hand" are used with the proportionally displaced coupled walking beam system 10 viewed in the direction of displacement of the walking beams or from right to left in the view of FIG. 1. The right- and left-hand rails 30, 32 are each provided with a respective plurality of notches 30a and 32a on the upper edges thereof and are positioned in spaced relation relative to one another and upon a support member 76. A first walking beam 34 having a plurality of transverse slots 34a on the upper surface thereof is positioned between the right- and left-hand rails 30, 32 and is capable of being displaced relative to the right- and left-hand rails along the length thereof. Each of the transverse slots 34a in the upper surface of the first walking beam 34 is adapted to receive a respective electronic component 18 having an axial lead 18a extending from each end thereof. As used herein the term "electronic" is intended to mean any electronic or electrical component used in a circuit in which electricity flows. With each of the transverse slots 34a in the first walking beam 34 holding an electronic component 18, alternating vertical and horizontal forward and reverse displacements of the first walking beam results in the leftward displacement of the electronic components positioned thereon. With the axial leads 18a of each electronic component 18 positioned within a respective pair of aligned notches 30a and 32a in the respective upper edges of the right- and left-hand rails 30, 32, the rectangular movement of the first walking beam 34 displaces the components leftward as viewed in FIG. 1 by repositioning the pair of axial leads on each component in the next, immediately adjacent pair of aligned notches on the right- and left-hand rails.

Positioned immediately adjacent to and aligned with the first walking beam 34 is a second walking beam 44 having a plurality of transverse slots 44a on an upper surface thereof. Positioned on respective sides of the second walking beam 44 and respectively aligned and continuous with the first pair of right- and left-hand rails 30, 32 is a second pair of right- and left-hand rails 40, 42. Each of the second pair of right- and left-hand rails 40, 42 has on an upper edge thereof a respective plurality of notches 40a, 42a. Aligned pairs of notches 40a, 42a are adapted to receive the axial leads 19a of an electronic component 19 and provide support therefor. As described earlier with respect to the first walking beam 34, rectangular alternating displacement of the second walking beam 44 in vertical and horizontal directions provides for the displacement of the electronic components 19 positioned thereon by sequentially repositioning each pair of axial leads associated therewith in a pair of aligned rail notches to the left of those notches in which the axial leads were previously positioned as viewed in FIG. 1. Although the first and second pairs of right- and left-hand rails have been described as separate and distinct elements, it can be seen from FIG. 1 that both right-hand rails and both left-hand rails can also each be fabricated from a single component such as from a single section of sheet metal.

Immediately adjacent portions of the first and second left-hand rails 32 and 42 are shown partially cut away to illustrate details of respective end portions 86 and 88 of the first and second walking beams 34 and 44. By thus positioning the end portions 86, 88 of the first and second walking beams 34, 44 immediately adjacent to one another, the electronic components may be transferred from the first walking beam to the second walking beam a described in detail below.

Positioned below the support member 76 and coupled to the second walking beam 44 by means of drive shaft 52 is displacement or drive mechanism 50. The upper end of the drive shaft 52 may be securely coupled to the second walking beam 44 by conventional means such as a nut and bolt combination (not shown). In a preferred embodiment, the displacement mechanism is a Stelron drive arrangement including a self-contained, cam-operated motor device which displaces the drive shaft 52 and the second walking beam 44 as shown by the direction of the arrows forming the rectangle positioned adjacent to the drive mechanism in FIG. 1. Taking point A in the aforementioned rectangular diagram as the starting position of the drive shaft 52 and following the direction of arrows forming the parallelogram, it can be seen that the drive mechanism 50 initially displaces the drive shaft 52 generally horizontally in a rightward direction to point B, followed by the upward vertical displacement of the drive shaft to point C. The drive shaft 52 is then displaced leftward in a generally horizontal direction by the drive mechanism 50 to point D, followed by the generally downward vertical displacement of the drive shaft to the starting point A. This motion can generally be described as the reciprocating, sequential, alternating vertical and horizontal displacement of the drive shaft 52. Similarly, displacement diagrams are shown for the second walking beam 44 in the apertures 54 and for the first walking beam 34 in apertures 56. These latter displacement diagrams illustrate that the second walking beam 44 is displaced a greater horizontal distance than the first walking beam 34. The manner in which this is accomplished is described in the following paragraphs.

With the upper end of the drive shaft 52 rigidly coupled to the second walking beam 44, the second walking beam undergoes a similar displacement sequence as described above. This is illustrated in the apertures 54 within the left-hand rail 42 associated with the second walking beam 44. As shown therein, a pair of connecting shafts 58 rigidly coupled to the second walking beam 44 and extending through a respective aperture 54 within the left-hand rail 42 undergo a similar displacement as that previously described with respect to the drive shaft 52. To the distal ends of each of the connecting shafts 58 is mounted a coupling block 60. Each of the coupling blocks 60 is further securely mounted by means of a respective pair of set screws as shown in the figure to a first equalizer bar 62 in spaced arrangement along the length thereof. Also positioned along the length of the first equalizer bar 62 intermediate the two aforementioned coupling blocks 60 and providing support for the equalizer bar is a first alignment bracket 64. The first alignment bracket 64 is mounted to the support member 76 and includes an aperture therein within which is positioned the first equalizer bar 62. Also positioned within the aperture in the first alignment bracket 64 and in contact with the first equalizer bar is a bearing sleeve 64a to facilitate the rotational and linear displacement of the first equalizer bar 62 within the first alignment bracket 64.

One end of the first equalizer bar 62 is provided with a collar 62a for securely mounting a first end of a coupling spring 66 thereto. A second end of the coupling spring 66 is securely mounted to one end of a second equalizer bar 72 by means of a similar spring mounting collar 72a. Fixedly positioned in spaced relation along the length of the second equalizer bar 72 are a pair of coupling blocks 70. Each of the coupling blocks 70 is securely connected to a distal end of a respective connecting shaft 68, the proximal ends of which extend through respective apertures 56 within the left-hand rail 32 and are securely coupled to the first walking beam 34. Positioned along the length of the second equalizer bar 72 and having an aperture therein through which the second equalizer bar extends is a second alignment bracket 74. Positioned within the aforementioned aperture and intermediate the second equalizer bar 72 and the second alignment bracket 74 is a bearing sleeve 74a. The bearing sleeve 74 facilitates the rotational and linear displacement of the second equalizer bar 72 within the second alignment bracket 74. A second end of the second equalizer bar 72 is connected by means of another spring mounting collar 72b to one end of a second biasing spring 78. The other end of the second biasing spring 78 is coupled to a spring stop bracket 80 fixedly mounted to the support member 76. With the second equalizer bar 72 coupled to the first equalizer bar 62 by means of the coupling spring 66, displacement of the first equalizer bar caused by the aforementioned reciprocating, sequential displacement of the first walking beam 34 will result in the displacement of the second equalizer bar and the first walking beam 34 coupled thereto via the connecting shafts 68.

Referring to FIGS. 2 through 5, the sequential displacement of the various components of the proportionally displaced coupled walking beam system 10 will now be described in detail. The position and configuration of the proportionally displaced coupled walking beam system shown in FIG. 2 corresponds to the position A in the displacement diagram of FIG. 1. Under the control of the drive mechanism 50, the combination of the drive shaft 52, the second walking beam 44, and the pair of connecting shafts 58 is displaced rightward as viewed in FIGS. 1 and 2. This results in a corresponding rightward displacement of the first equalizer bar 62 which is coupled to the connecting shafts 58 by means of a respective pair of coupling blocks 60. With the second equalizer bar 72 coupled to the first equalizer bar 62 by means of the coupling spring 66, the second equalizer bar is similarly displaced rightward under the control of the drive mechanism 50. However, the displacement between the first and second equalizer bars is not on a 1:1 basis since they are not rigidly coupled, but rather are coupled by the resilient, flexible coupling spring 66. Rightward displacement of the second equalizer bar 72 results in a corresponding displacement of the first walking beam 34 coupled thereto by means of connecting shafts 68. As the second equalizer bar 72 is displaced rightward, the second biasing spring undergoes compression against the spring stop bracket 80.

When point B in the displacement diagram is reached, the drive mechanism 50 displaces the drive shaft 52 upward to point C. With the first and second walking beams 34, 44 coupled by means of a transfer mechanism 16 described in detail below, upward displacement of the second walking beam 44 by means of the drive mechanism 50 results in an equal upward displacement of the first walking beam 34. With each of the first and second walking beams 34, 44 positioned at points corresponding to location C in the displacement diagram, the electronic components 18 and 19 are respectively positioned within the slots 34a and 44a of the first and second walking beams. In this configuration, the upraised position of the first and second walking beams 34, 44 causes the respective axial leads 18, 19a of the electronic components 18 and 19 to be removed from the aligned pairs of notches 30a, 32a and 40a, 42a in the right- and left-hand rails positioned immediately adjacent to each of the first and second walking beams.

Figure 3:
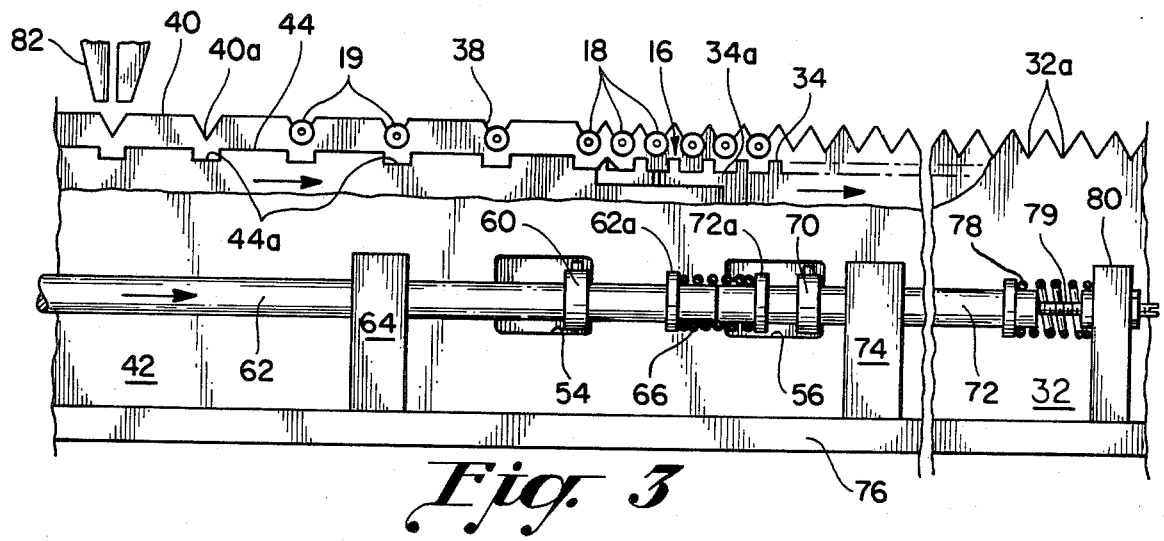

The position of the various components corresponding to the location of point B in the displacement diagram is illustrated in FIG. 3. From FIG. 3, it can be seen that each of the respective slots 34a and 44a in the first and second walking beams 34, 44 is positioned immediately below a respective pair of aligned notches in the right- and left-hand rail located immediately adjacent to each of the aforementioned walking beams. Thus, the transverse slots 34a in the first walking beam 34 are positioned directly below the electronic components 18 positioned in the paired, aligned notches in the right- and left-hand rails 30, 32 located immediately adjacent to respective lateral portions of the first walking beam. Similarly, the transverse slots 44a in the second walking beam 44 are positioned directly below paired, aligned notches in the right- and left-hand rails 40, 42 positioned immediately adjacent to respective lateral portions of the second walking beam.

As shown in FIG. 3, with the drive system and various components thereof displaced to the right and located in position B in the displacement diagram, the first coupling spring 66 and the second biasing spring 78 are subjected to an increased compression. With the first and second equalizer bars 62, 72 fully displaced to the right and with the first coupling spring 66 and the second biasing spring 78 fully compressed, one end of the first equalizer bar is positioned in abutting contact with the immediately adjacent end of the second equalizer bar, while the other end of the second equalizer bar is positioned in abutting contact with a third bar 79 mounted on and extending from the spring stop bracket 80. The abutting engagement of respective adjacent ends of the first and second equalizer bars 62, 72 and the third bar 79 thus prevents further rightward displacement of each of the first and second equalizer bars 62, 72 as well as the further rightward displacement of the first and second walking beams 34, 44. Thus, rightward displacement of the second walking beam 44 and the first equalizer bar 62 is directly controlled by the displacement mechanism 50, while rightward displacement of the first walking beam 34 and the second equalizer bar 72 is limited by the third bar 79.

Figure 4:
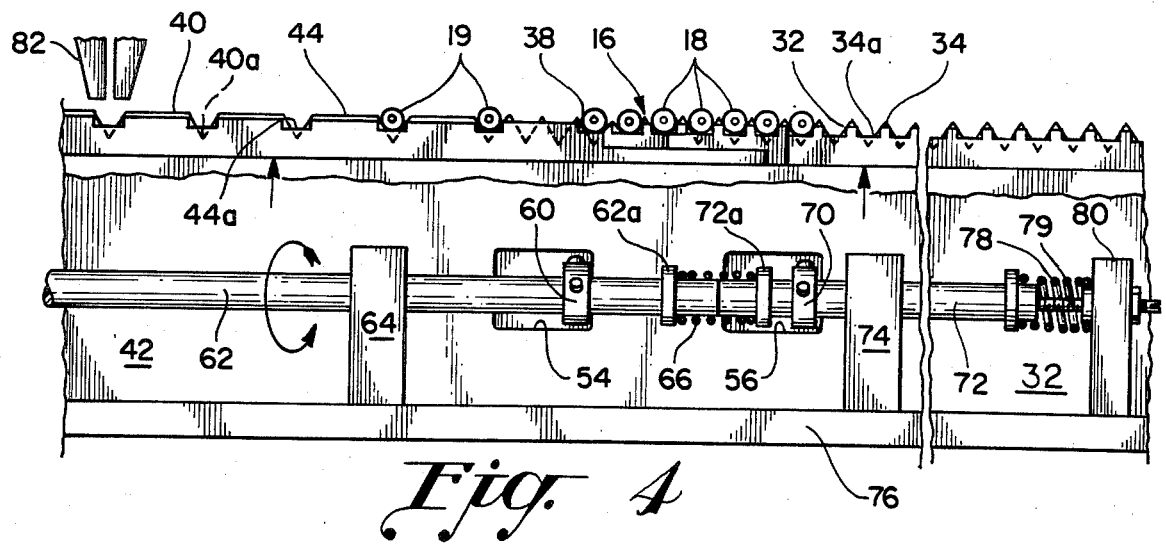

Referring to FIG. 4, the location of various components is shown for the position C in the displacement diagram wherein the first and second equalizer bars 62, 72 are rotated in a counterclockwise direction as viewed along the length thereof from right to left in the figures. This counterclockwise rotation of the first and second equalizer bars 62, 72 is the result of the upward displacement of the drive shaft 52 under the control of the drive mechanism 50. Upward vertical displacement of the drive shaft 52 under the control of the drive mechanism 50 causes a corresponding upward vertical displacement of the second walking beam 44. With the first and second walking beams 34, 44 coupled by means of the transfer mechanism 16, vertical displacement of the second walking beam 44 by means of the drive mechanism 50 results in a corresponding vertical displacement of the first walking beam 34. This is shown in FIG. 4 wherein each of the first and second walking beams 34, 44 has been displaced upward such that the respective transverse slots 34a, 44a therein are positioned above the lowest portion of the aligned pairs of notches in the right- and left-hand rails located immediately adjacent to respective lateral portions of the first and second walking beams. With the first and second walking beams 34, 44 in a thus upraised position, the electronic components 18, 19 are positioned within and supported by respective transverse slots 34a, 44a in the first and second walking beams.

Figure 5:
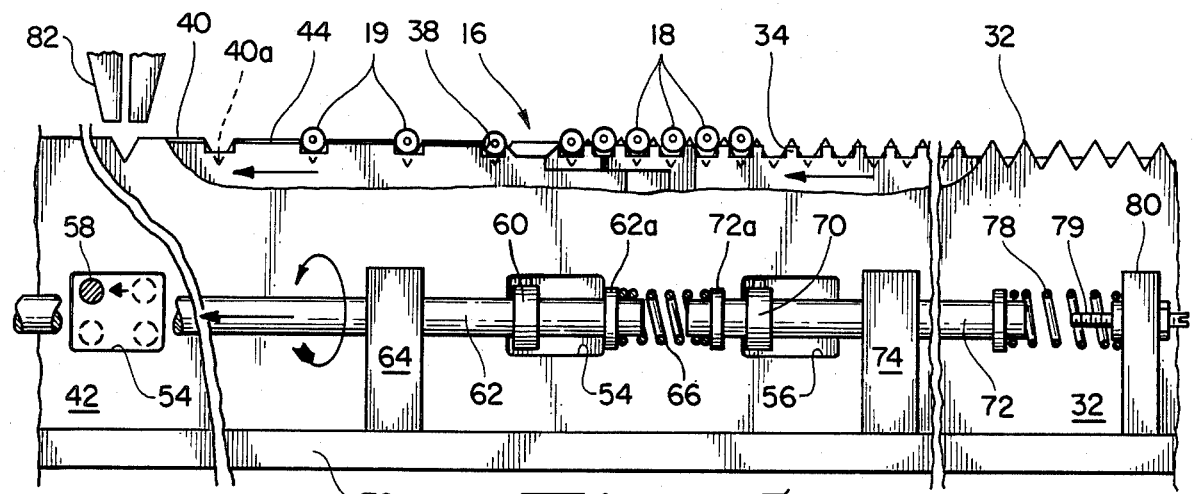

Referring to FIG. 5, there is shown the position of various components in the proportionally displaced coupled walking beam system 10 for location D in the displacement diagram. With the first and second walking beams 34, 44 in the fully upraised position of FIG. 4 and engaging and supporting the various electronic components positioned on the walking beams, the drive shaft 52 as well as the first equalizer bar 62 is displaced leftward by the drive mechanism 50. Similarly, with one end of the second equalizer bar 72 coupled to and urged leftward by the second biasing spring 78, the first walking beam 34 which is coupled to the second equalizer bar is urged leftward to position D in the displacement diagram. With the electronic components 18, 19 respectively positioned upon the leftward displaced first and second walking beams 34, 44, the electronic components undergo a similar leftward displacement so as to be positioned above immediately adjacent pairs of aligned notches in the right- and left-hand rails positioned immediately adjacent to the lateral portions of the first and second walking beams. It is in this manner that the electronic components are displaced leftward in a stepwise manner by sequentially transferring each component to an immediately adjacent pair of aligned notches in the right- and left-hand rails associated with each of the first and second walking beams 34, 44.

As shown in FIG. 5, the connecting shaft 58 is positioned in the upper left-hand corner of the aperture 54 in the left-hand rail 42 after the electronic components have been shifted leftward to the next pair of aligned notches. After each of the electronic components has thus been positioned directly over the next immediately adjacent pair of aligned notches, the drive mechanism 50 then displaces the drive shaft 52 downward resulting in the clockwise rotation of the first and second equalizer bars 62, 72 and the positioning of the various components upon the next, immediately adjacent pair of aligned notches in the aligned right- and left-hand rails. This corresponds to position A in the displacement diagram and allows the proportionally displaced coupled walking beam system to undergo the next displacement cycle in moving each of the electronic components leftward to the next pair of aligned notches in the right- and left-hand rails. It is in this manner that the electronic components are displaced leftward in a stepwise manner for positioning immediately beneath the component gripper 82 for manipulation by the component gripper as required in the processing of these electronic components.

Figure 6:
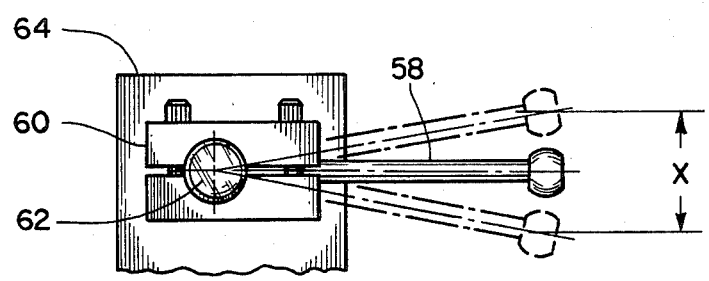
FIG. 6 is a sectional view of a portion of the proportional coupling arrangement for displacing the walking beams illustrating the sequential displacement of the proportional coupling arrangement.

Referring to FIG. 6, there is shown a sectional view of the first equalizer bar 62 positioned within the first alignment bracket 64. Positioned between the first equalizer bar 62 and the first alignment bracket 64 is a bearing sleeve 64a as described above which allows for the linear and rotational displacement of the equalizer bar within the alignment bracket. Also shown in FIG. 6 are the various orientations assumed by the connecting shafts 58 which are coupled to the first equalizer bar 62. The lower orientation of the connecting shaft 58 shown in dotted line form corresponds to positions A and B in the displacement diagram. Similarly, the uppermost orientation of the connecting shaft 58 also shown in dotted line form corresponds to positions C and D in the displacement diagram. The intermediate position of the connecting shaft 58 shown in solid line form in the figure is assumed by the connecting shaft during the vertically upward or downward displacements of the connecting shaft between positions B and C or D and A in the displacement diagram. The distal end of the connecting shaft 58 is coupled to the second walking beam as described earlier, although this is not shown in FIG. 6.

Figure 7:
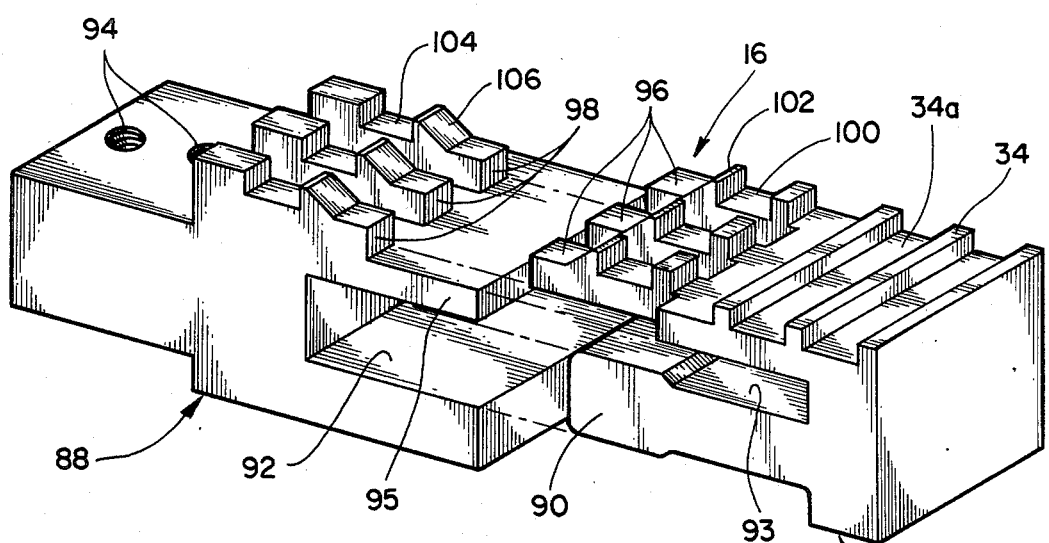
FIG. 7 is an exploded perspective view of respective ends of the first and second walking beams which are positioned immediately adjacent to one another and between which articles positioned upon and displaced by the walking beams are transferred.

As shown in the various figures, a transfer mechanism 16 is positioned along the length of the aligned first and second walking beams 34, 44 and provides for the transfer of electronic components from the first to the second walking beam. The transfer mechanism 16, an exploded perspective view which is shown in FIG. 7, is comprised of the combination of a first end portion 86 of the first walking beam 34 and an immediately adjacent second end portion 88 of the second walking beam 44. Each of the respective end portions 86, 88 of the first and second walking beams 34, 44 may be integral with or coupled to its associated walking beam. For example, as shown in FIG. 7, the second end portion 88 of the second walking beam may include a pair of threaded apertures 94 by means of which the second end portion may be securely coupled to an end of the second walking beam by means of a pair of threaded coupling pins (not shown). The first end portion 86 includes a first tongue 90 which extends the width thereof. Similarly, the second end portion 88 includes a first groove or slot 92 extending the width thereof which is adapted to receiving the first tongue 92 of the first end portion 86. The first end portion 86 further includes a second groove 93 which is adapted to receive a second tongue portion 95 of the second end portion 88. This arrangement of complementary tongue and groove configurations maintains vertical alignment and allows for lateral displacement between the first and second end portions 86 and 88.

The first end portion 86 also includes a plurality of first spaced fingers 96 extending laterally outward along the length thereof. Similarly, positioned on an upper surface of the second end portion 88 are a plurality of second spaced fingers 98. The spaces immediately adjacent to and between the first fingers 96 are adapted to receive the second fingers 98. Similarly, the spaces immediately adjacent to and between the second fingers 98 are adapted to receive the first fingers 96. This interconnected finger and slot arrangement maintains lateral alignment between the first and second end portions 86, 88 and allows for the relative displacement of these end portions toward and away from each other.

Positioned on the upper surface of the first end portion 86 are plurality of transverse slots 34a adapted for receiving and providing support for a respective electronic component (not shown in FIG. 7) positioned therein as described above. Each of the first fingers 96 is provided with a respective slot therein forming the last slot 100 of the first walking beam 34. Similarly, each of the second fingers 98 is provided with a slot on the upper surface thereof so as to form the first slot 104 of the second walking beam. The facing portions of the last slot 100 of the first walking beam and the first slot 104 of the second walking beam are provided with a plurality of respective first and second ramps 102, 106 thereon. With the first and second end portions 86, 88 positioned in an overlapping, aligned manner with respect to each other, the first ramps 102 are aligned with the second ramps 106. An electronic component positioned in the next to the last pair of notches in the right- and left-hand rails 30, 32, with only the next to the last notch of the right-hand rail 30 shown as element 30b in the various figures, is engaged by the last slot 100 in the first walking beam and is displaced to the last pair of notches 30c in the aforementioned right- and left-hand rails. The electronic component thus positioned in the last pair of notches 30c right- and left-hand rails 30, 32 is then engaged by the first slot 104 in the second walking beam in the next displacement cycle of the proportionally displaced coupled walking beam system. With the electronic component positioned in the first slot 104 of the second walking beam, the leftward displacement of the second walking beam causes the electronic component to be removed from the last paired notches 30c of rails 30 and 32 and to be positioned in the first pair of aligned notches 38 of rails 40 and 42 shown in FIG. 1. The electronic component is then sequentially displaced between adjacent aligned notches in the right- and left-hand rails 40, 42 as previously described. It is in this manner that the electronic components are transferred from the first walking beam 34 to the second walking beam 44 and the inter-component spacing is changed from one walking beam to the other.

There has thus been shown an arrangement for coupling first and second walking beams by means of a proportional displacement arrangement wherein the reciprocating, alterhating horizontal and vertical displacement of the second walking beam causes a corresponding proportional displacement of the first walking beam. Components positioned on one of the walking beams having a first inter-component spacing or pitch may be transferred to the other walking beam having a second inter-component spacing. In this manner, the electronic components may be linearly displaced in a continuous manner while undergoing a change in the inter-component spacing to facilitate automatic manipulation of the electronic components by a robotic handling apparatus as used in the processing, testing and insertion of the electronic components in an electrical apparatus.

While particular embodiments of the present invention have been shown and described, it will be obvious to those skilled in the art that changes and modifications may be made without departing from the invention in its broader aspects. Therefore, while the present invention has been described in terms of the positioning and displacement of electronic components, it has application to any article which is positioned upon and displaced by a conveyor-type of walking beam. In addition, while the present invention has been described in terms of the transfer of articles between two adjacent walking beams so as to increase the inter-article spacing, this invention will operate equally well in the transfer of articles so as to decrease the inter-article spacing by merely reversing the direction of operation of the drive mechanism. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A transport system for moving articles along a linear path comprising:
   a first walking beam for supporting and transporting articles positioned thereon, said first walking beam having a first end and characterized as having a first pitch;
   a second walking beam for supporting and transporting articles positioned thereon, said second walking beam having a second end positioned adjacent to the first end of said first walking beam and characterized as having a second pitch wherein said first and second pitches are different;
   drive means coupled to said second walking beam for displacing said second walking beam in a first reciprocating, repetitive manner characterized by an alternating sequence of first and second vertical and horizontal displacements wherein said first and second vertical displacements and said first and second horizontal displacements are in opposite directions; and
   proportional coupling means for coupling said first and second walking beams and for displacing said first walking beam in a second reciprocating, repetitive manner corresponding to said first reciprocating, repetitive manner and characterized by an alternating sequence of third and fourth vertical and horizontal displacements, wherein said third and fourth vertical displacements and said third and fourth horizontal displacements are in opposite directions and said third and fourth horizontal displacements are not equal to said first and second horizontal displacements and wherein the articles are transferred from the first end of said first walking beam to the second end of said second walking beam.

2. The article transport system of claim 1 wherein said drive means comprises a Stelron drive mechanism.

3. The article transport system of claim 1 wherein said proportional coupling means includes a flexibly resilient member for allowing for the difference between the first and second horizontal displacements of said second walking beam and the third and fourth horizontal displacements of said first walking beam.

4. The article transport system of claim 3 wherein said proportional coupling means further includes first and second equalizer bars respectively coupled to said first and second walking beams and to said resilient member.

5. The article transport system of claim 4 wherein said resilient member is a first coiled spring oriented generally horizontally and coupled at respective ends thereof to said first and second equalizer bars.

6. The article transport system of claim 5 wherein the first and second equalizer bars are respectively coupled to lateral portions of said first and second walking beams and are horizontally and rotationally displaced in response to displacement of said drive means.

7. The article transport system of claim 6 further including first and second alignment brackets each including a bearing sleeve and respectively coupled to and supporting said first and second walking beams to allow for the rotational and translational displacement of said walking beams.

8. The article transport system of claim 7 further comprising biasing means connected to said proportional coupling means for urging said proportional coupling means and the first and second walking beams coupled thereto generally horizontally in the direction of movement of the articles.

9. The article transport system of claim 8 further comprising stop means connected to said proportional coupling means for limiting the horizontal displacement of said first and second walking beams in a direction opposite to direction of movement of the articles.

10. The article transport system of claim 1 wherein the respective first and second ends of said first and second walking beams are positioned immediately adjacent to one another in an overlapping manner so as to form a continuous support surface for the articles.

11. The article transport system of claim 10 wherein the respective first and second ends of said first and second walking beams each include plurality of fingers with slots therebetween and wherein the fingers of each end are positioned in tight fitting relation in the slots of the other end.

12. The article transport system of claim 11 wherein the respective first and second ends of said first and second walking beams further include an overlapping tongue and groove arrangement for maintaining vertical alignment therebetween.

13. The article transport system of claim 1 wherein each walking beam includes a plurality of transverse slots on an upper portion thereof and the articles are axial lead electronic components positioned within each of said transverse slots.

* * * * *